(12) United States Patent
Daniali

(10) Patent No.: US 11,366,739 B2
(45) Date of Patent: Jun. 21, 2022

(54) PIPELINE FOR VALIDATION PROCESS AND TESTING

(71) Applicant: T-Mobile USA, Inc., Bellevue, WA (US)

(72) Inventor: Ali Daniali, Tukwila, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 16/931,086

(22) Filed: Jul. 16, 2020

(65) Prior Publication Data

US 2022/0019515 A1   Jan. 20, 2022

(51) Int. Cl.
G06F 11/36 (2006.01)

(52) U.S. Cl.
CPC ...... *G06F 11/3608* (2013.01); *G06F 11/3688* (2013.01); *G06F 11/3692* (2013.01)

(58) Field of Classification Search
None
See application file for complete search history.

(56) References Cited

U.S. PATENT DOCUMENTS

| | | | | |
|---|---|---|---|---|
| 10,013,340 B1 * | 7/2018 | Quadras | ............. | G06F 11/3688 |
| 10,459,835 B1 * | 10/2019 | George | ................. | G16H 40/00 |
| 11,063,849 B1 * | 7/2021 | Clegg | ..................... | H04L 67/02 |
| 2006/0259629 A1 * | 11/2006 | Usmani | ................ | H04W 24/08 |
| | | | | 709/227 |
| 2007/0079189 A1 * | 4/2007 | Jibbe | ................ | G01R 31/31707 |
| | | | | 714/724 |
| 2014/0282421 A1 * | 9/2014 | Jubran | ................ | G06F 11/3688 |
| | | | | 717/126 |
| 2014/0325481 A1 * | 10/2014 | Pillai | ................... | G06F 11/3668 |
| | | | | 717/124 |
| 2015/0161386 A1 * | 6/2015 | Gupta | ...................... | G06N 5/04 |
| | | | | 726/22 |
| 2018/0060226 A1 * | 3/2018 | Siggers | ............... | G06F 11/3692 |
| 2019/0188037 A1 * | 6/2019 | Tekelioglu | ............ | G06F 9/4881 |
| 2019/0294533 A1 * | 9/2019 | Sharma | ............... | G06F 11/3688 |
| 2019/0303164 A1 * | 10/2019 | King | ..................... | G06T 7/0004 |
| 2019/0361797 A1 * | 11/2019 | Yerli | ................... | G06F 11/3668 |
| 2020/0073783 A1 * | 3/2020 | Hortala | ..................... | G06F 9/54 |
| 2020/0293436 A1 * | 9/2020 | Carames | ............. | G06F 11/3688 |

* cited by examiner

*Primary Examiner* — Andrew M. Lyons

(57) ABSTRACT

Techniques are described herein for implementing a testing and evaluation pipeline. The techniques include receiving testing specifications for validating an XR application executing on XR capable devices and mapping individual testing specifications to a corresponding XR capable device including the XR application. Upon mapping the individual testing specifications, testing configurations for an evaluation pipeline is determined. The evaluation pipeline may include one or more computing instances that execute one or more validation tests for the XR application executing on the corresponding XR capable device according to the individual testing specifications and the testing configurations. The one or more computing instances may operate in parallel to perform the one or more validation tests concurrently. Based at least on test results generated from the one or more computing instances and one or more evaluation criteria, the XR application executing on the corresponding XR capable device may be validated.

20 Claims, 6 Drawing Sheets

PIPELINE FOR VALIDATION PROCESS AND TESTING

BACKGROUND

Software validation is determining if a system complies with the requirements and performs functions for which it is intended and meets an organization's goals and user needs. Validation is typically completed at the end of a software development process and is performed after a software product is produced against established criteria to ensure that the product integrates correctly into the environment. However, validation may also be employed during testing, provisioning, updating, patching, and so on.

In many cases, validation process and testing may be performed for these various scenarios on a number of user devices operating under different network conditions as organizations may wish to perform tests to validate certain configurations, modifications, patches, or bug fixes to properly supply the functionality desired by organizations and users alike. Additionally, the user devices may be produced by various original equipment manufacturers (OEMs) that maintain different device-specific testing specifications. As a result, supporting the validation process and testing can require specialized equipment and a wide range of resources.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
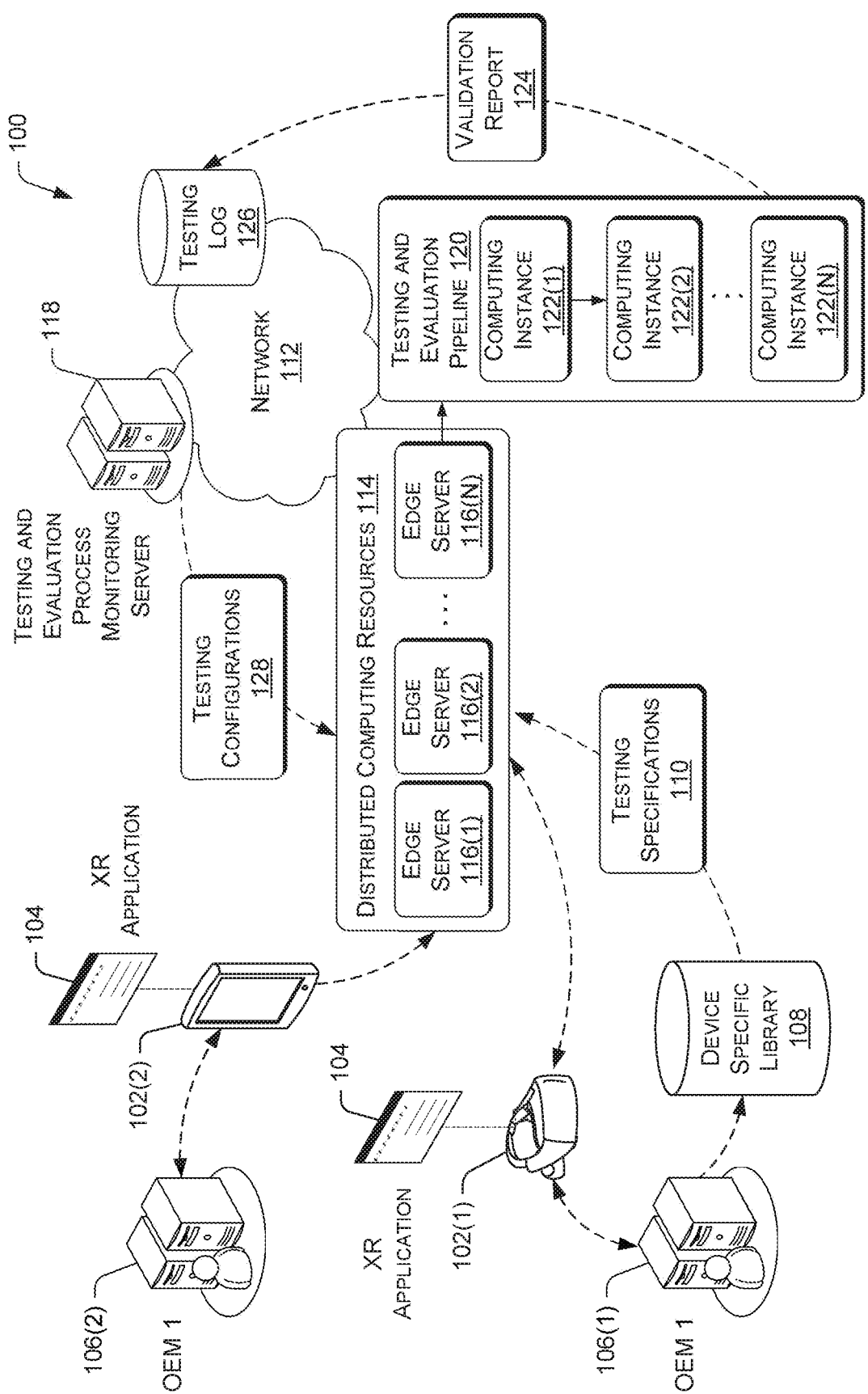
FIG. 1 illustrates an example of network architecture for implementing a testing and evaluation pipeline to perform the validation process and testing.

Techniques are disclosed for implementing a validation process pipeline in order to perform the validation process and testing. In one example, the validation process and testing may be applied to an extended reality (XR) application executed on one or more user devices or XR capable devices. As used herein, "XR" refers to all real and virtual environments generated by computer graphics and wearables. The "X" in XR is simply a variable that can stand for any letter. XR is the umbrella category that covers all the various forms of computer-altered reality, including Augmented Reality (AR), Mixed Reality (MR), and Virtual Reality (VR).

In one aspect, distributed computing resources such as edge servers that provide one or more computing instances may be a part of a testing and evaluation pipeline. The testing and evaluation pipeline may operate in a virtual computing environment. The computing instances in the testing and evaluation pipeline are configured to execute one or more validation tests. The individual computing instances may operate concurrently or in a sequence. For example, multiple computing instances may be instantiated in one or more testing and evaluation pipelines to execute duplicate validation tests concurrently. In another example, a first computing instance may perform a first validation test, and pass the results generated by the first computing instance to a second computing instance to perform a second validation test, and so on until all of the tests are completed. In yet another example, the results may be returned to or staged in a queue until the next computing instance is available (e.g., in a round-robin scheme) to perform the next sequence of the validation tests. The validation tests may be performed in a specified order or on as one or more computing instances become available. Further, individual computing instances may be assigned to perform specific validation tests.

Test data and test parameters for the validation tests may be stored at a testing and evaluation process monitoring server. The testing and evaluation process monitoring server may be operated by a telecommunications service provider or a third party working in with the telecommunications service provider. In some examples, the validation tests may include functional tests, performance tests, security tests, usability tests, compatibility tests, recoverability tests, regression tests, and/or so forth.

The distributed computing resources may receive testing specifications from one or more device-specific libraries maintained by OEMs that produce various XR capable devices. The testing specifications may include information relating to the operating system, file system, hardware, and/or other software systems of an XR capable device that includes the XR application. As testing specifications are received from multiple device-specific libraries, the distributed computing resources may map the individual testing specifications to a corresponding XR capable device including the XR application. Based at least on the testing specifications, the testing and evaluation process monitoring server may provide testing configurations to the testing and evaluation pipeline. In one example, the testing configurations may specify which validation tests to apply. The testing configurations may also identify which computing instance to instantiate in a testing and evaluation pipeline, and further assign individual computing instances to execute one or more validation tests.

The testing and evaluation pipeline may provide a validation report to a testing log, which may be communicatively coupled to the testing and evaluation process monitoring server. The validation report may include test results. In some aspects, the testing and evaluation process monitoring server may store product requirements and validation criteria. The testing and evaluation process monitoring server may receive the validation report from the testing log and validate the XR application based at least on the results in view of the product requirements and the validation criteria. In some embodiments, the testing and evaluation pipeline may also validate the XR application based at least on one or more of the results in the validation report during the validation process as one or more tests are being applied.

Testing of XR applications running on multiple types of XR capable devices (e.g., head-mounted devices [HMD], mobile devices, etc.) can occur on edge computing devices such that analyses need not be performed locally on an XR capable device. Additionally, multiple validation and testing pipelines may be implemented to concurrently test the XR application operating on numerous XR capable devices, wherein the individual XR capable devices may include different software features and hardware components. Accordingly, the individual XR capable devices may correspond to a set of testing configurations based at least on respective testing specifications. For instance, a first validation and testing pipeline may perform validation testing per a first set of testing configurations corresponding to a first XR capable device including the XR application, and a second testing and evaluation pipeline may perform validation testing per a second set of testing configurations corresponding to a second XR capable device including the XR application.

The techniques described herein may reduce traffic and meet low latency targets by extending cloud computing to endpoints while conducting multiple validation tests in parallel for multiple devices to increase efficiency. Additionally, the testing and evaluation pipeline automates the validation process and reduces requirements for intervention during the engineering and manufacturing development phase. The techniques described herein may be implemented in a number of ways. Example implementations are provided below with reference to the following figures.

Example Network Architecture

FIG. 1 illustrates an example architecture 100 for implementing a testing and evaluation pipeline to execute testing of an XR application on various XR capable devices. The architecture 100 may include one or more XR capable devices 102(1) and 102(2). The individual XR capable devices 102(1) and 102(2) may be produced or provided by an OEM 106(1) and 106(2), respectively. In FIG. 1, the first XR capable device 104(1) may be a head-mounted device (HMD) and the second XR capable device 104(2) may be a smartphone. In various embodiments, the XR capable devices 102(1) and 102(2) may be other mobile devices, personal digital assistants (PDAs), or other electronic devices having a wireless communication function that is capable of receiving input, processing the input, and generating output data. The XR capable devices 102(1) and 102(2) are connected to a telecommunication network 112 utilizing one or more wireless base stations or any other common wireless or wireline network access technologies.

The network 112 can be a cellular network that implements 2G, 3G, 4G, 5G, and long-term evolution (LTE), LTE advanced, high-speed data packet access (HSDPA), evolved high-speed packet access (HSPA+), universal mobile telecommunication system (UMTS), code-division multiple access (CDMA), global system for mobile communications (GSM), a local area network (LAN), a wide area network (WAN), and/or a collection of networks (e.g., the Internet).

Each of the XR capable devices 102(1) and 102(2) includes an XR application 104. Examples of XR applications include architecture, visual art, commerce, education, emergency services, video games, medical, military, navigation, and workplace applications. In any of these applications, a user may wear the first XR capable device 102(1) such as an HMD in order to interact with one or more digitally-generated entities displayed by the first XR capable device 102(1). Additionally, a user may utilize the second XR capable device 102(2) such as a smartphone in order to interact with one or more digitally-generated entities displayed by the second XR capable device 102(2).

FIG. 1 also includes a testing and evaluation process monitoring server 118 that may store test data and test parameters for the validation tests. In one example, validation tests may include functional tests, performance tests, security tests, compatibility tests, recoverability tests, and/or so forth. Regression testing may also be performed after the desired changes or modifications are made to the existing code after completing one or more validation tests.

The functional tests generally evaluate whether the XR application 104 operates as specified in product requirements. In this regard, the functional tests may evaluate the interactions between individual software modules of the XR application 104. The functional tests may also evaluate the interactions between the software modules of the XR application 104 and the operating system, file system, hardware (e.g., input devices such as a microphone, a keyboard/keypad, mouse devices, a touch-sensitive display that accept gestures, voice or speech recognition devices, hand gesture recognition devices, etc.), and/or other software systems of the XR capable devices 102(1) and 102(2) on which the XR application 104 resides. The functional tests may also validate whether the XR application 104 performs according to the requirement of all versions of mobile communication protocols (e.g., 3G, 4G, LTE, 5G, etc.). Further, the functional tests may validate whether the XR application 104 enables the XR capable devices 102(1) and 102(2) to display appropriate notifications and error messages.

The performance tests determine whether the XR application 104 performs acceptably under certain performance requirements (e.g., access by a large number of users) or different load conditions. For example, the performance tests may determine whether a network coverage can support the XR application 104 at a peak user level, an average user level, and a minimum user level. The performance tests may also determine whether the XR application 104 performs acceptably under certain performance requirements when a network is changed to WiFi from a cellular network or vice versa while moving around with the XR capable device, or when only intermittent phases of connectivity are available.

The performance tests may further determine whether the existing client-server configuration setup provides the required optimum performance level (e.g., as specified under product requirements and/or evaluation criteria), and help identify various application and infrastructure bottlenecks which prevent the XR application 104 from performing at the required acceptability levels. Additionally, the performance tests may help validate whether the response time of the XR application 104 is as per the requirements. In some aspects, the performance tests may also evaluate whether the energy consumption (e.g., battery lifespan) of the XR capable devices 102(1) and 102(2) can support the XR application 104 to perform under projected load volumes.

The security tests may generally analyze the data storage and data validation requirements, enable the session management for preventing unauthorized users to access unsolicited information, and determine whether the business logic implementation is secured and not vulnerable to any attack from external systems. The compatibility tests generally determine whether the XR application 104 is compatible with the XR capable devices 102(1) and 102(2). The XR capable devices 102(1) and 102(2) may have different operating systems, resolution, screen, version, and hardware. For instance, the compatibility tests may validate that the user interface of the XR application 104 fits the screen size of the XR capable devices 102(1) and 102(2), such that no text or content on the user interface is only partially visible or inaccessible on the XR capable devices 102(1) and 102(2). The recoverability tests generally evaluate crash recovery and transaction interruptions. For example, the recoverability tests may determine how the XR application 104 handles recovery after unexpected interruption/crash scenarios. In another example, the recoverability tests validate how the XR application 104 handles transactions during a power failure or when a connection to a network is suspended.

The validation tests may be executed via distributed computing resources 114 such as edge servers 116(1)-116(N). The edge servers 116(1)-116(N) may include general-purpose computers, such as desktop computers, tablet computers, laptop computers, servers (e.g., on-premise servers), or other electronic devices that are capable of receiving input, processing the input, and generating output data. The edge servers 116(1)-116(N) may store data in a distributed storage system, in which data may be stored for long periods and replicated to guarantee reliability.

Accordingly, the edge servers 116(1)-116(N) may provide data and processing redundancy, in which data processing and data storage may be scaled in response to demand. Further, in a networked deployment, new edge servers may be added. Thus, the edge servers 116(1)-116(N) can include a plurality of physical machines that may be grouped and presented as a single computing system. Each physical machine of the plurality of physical machines may comprise a node in a cluster. The edge servers 116(1)-116(N) may also be in the form of virtual machines, such as virtual engines and virtual servers.

In one aspect, the edge servers 116(1)-116(N) provide computing instances 122(1)-122(N) that may be a part of a testing and evaluation pipeline 120. In one example, testing specifications 110 from a device-specific library 108 corresponding to an XR capable device 102(1) may be transmitted to one or more edge servers 116(1)-116(N). The device-specific library 108 may be maintained by the OEM 106(1) that produces the XR capable device 102(1). The edge servers 116(1)-116(N) may in turn provide the testing specifications 110 to the testing and evaluation process monitoring server 118. The testing specifications 110 may include information relating to the operating system, file system, hardware, and/or other software systems of an XR capable device that includes the XR application.

The testing and evaluation process monitoring server 118 is configured to provide testing configurations 128 to the testing and evaluation pipeline 120 based at least on the testing specifications 110. The testing configurations 128 may specify which validation tests to apply. The testing configurations may also identify which of the computing instances 122(1)-122(N) to instantiate in a testing and evaluation pipeline. Additionally, the testing configurations 128 may specify which of the computing instances 122(1)-122(N) to execute one or more validation tests.

One or more computing instances 122(1)-122(N) in the testing and evaluation pipeline 120 may perform multiple validation tests in parallel in accordance with the testing configurations 128. In one example, a first computing instance 122(1) may execute a first validation test, a second computing instance 122(2) may execute a second validation test, a third computing instance 122(N) may execute a third validation test, and so forth. The computing instances may execute the validation tests concurrently or in sequence. In the latter case, one computing instance may pass the results of a validation test to the next computing instance in sequence to perform the next validation test, and so forth until all of the validation tests are completed. In another example, multiple computing instances 122(1)-122(N) may execute duplicate validation tests in one or more testing and evaluation pipeline. For instance, the first and second computing instances may each execute the first validation test concurrently. Additional computing instances may be instantiated as needed. In some aspects, the individual computing instances 122(1)-122(N) may generate test results and place the test results in an output queue before additional validation tests are applied. Subsequently, available computing instances 122(1)-122(N) may be selected, for example, in a round-robin fashion, to perform additional validation tests.

Upon completing the validation testing, the testing and evaluation pipeline 120, may generate a validation report 124 to be transmitted to a testing log 126. The validation report 124 may include test results from the individual validation tests. The testing log 126 may interface with the testing and evaluation process monitoring server 118. Accordingly, the testing log 126 may pass the validation report 124 to the testing and evaluation process monitoring server 118. The testing and evaluation process monitoring server 118 may also interface with OEMs 106(1) and 106(2) and a network provider to receive product requirements and evaluation criteria. In response to receiving the validation report 124, the testing and evaluation process monitoring server 118 may analyze the test results and perform validation of the XR application 104 based at least on the product requirements and the evaluation criteria.

In some examples, one or more computing instances 122(1)-122(N) in the testing and evaluation pipeline 120 may also perform validation of the XR application 104. For example, one or more computing instances 122(1)-122(N) may receive product requirements and the evaluation criteria from the testing and evaluation process monitoring server 118 and analyze individual test results as the validation tests are completed in a sequence. If one or more of the computing instances 122(1)-122(N) determine that a test result generated by a first computing instance executing a first validation test indicates that the XR application is not validated at least in part, then the next computing instance (e.g., a second computing instance) in the sequence may terminate the validation testing process before completing additional validation tests and transmit the validation report 124 to the testing log 126. Alternatively, all of the validation tests may be completed before one or more of the computing instances 122(1)-122(2) validate the XR application 104.

Example Process Diagram

Figure 2:
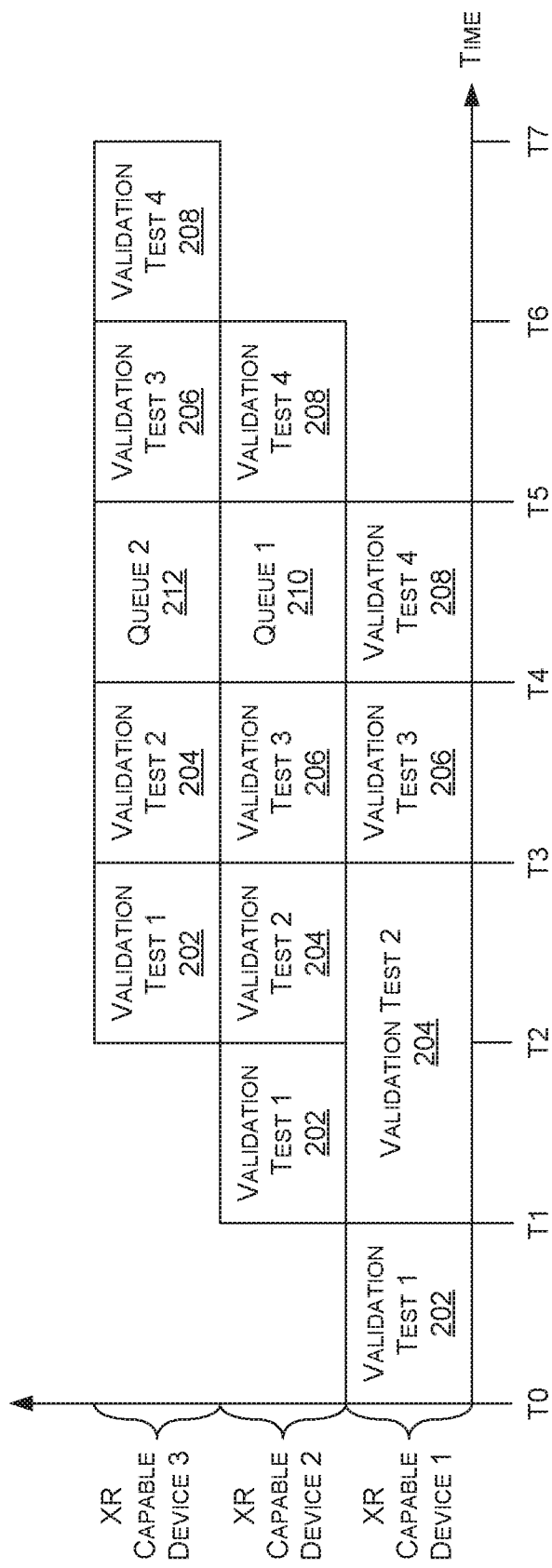
FIG. 2 is a process diagram showing the validation process and testing via a testing and evaluation pipeline.

FIG. 2 is a process diagram showing multiple validation tests being performed in parallel via a testing and evaluation pipeline. The illustrated embodiment of the process diagram shows a parallel validation testing process for an XR application executed via a first XR capable device, a second XR capable device, and a third XR capable device. One or more computing instances of the testing and evaluation pipeline may execute the validation tests 202-208 of FIG. 2 in several configurations.

In one example, a first computing instance may execute validation test 1 202, a second computing instance may execute validation test 2 204, a third computing instance may execute validation test 3 206, a fourth computing instance may execute validation test 4 208, and/or so forth. In another example, a first computing instance may execute the validation tests for the first XR capable device, a second computing instance may execute the validation tests for the second XR capable device, a third computing instance may execute the validation tests for the third XR capable device, and/or so forth. Accordingly, a computing instance may perform one or more validation tests, depending upon embodiments.

In some aspects, one or more of the validation tests may take a longer amount of time to complete than other validation tests. For example, validation test 1 202 is performed from $t_0$ to $t_1$ for the first XR capable device. Validation test 2 204 is performed from $t_1$ to $t_3$. At $t_3$ to $t_4$, validation test 3 206 is performed. At $t_4$ to $t_5$, validation test 4 208 is performed. Accordingly, validation test 2 204 may take a longer amount of time to complete than validation test 1 202, validation test 3 206, and validation test 4 208. In other embodiments, however, additional tests may take a longer or shorter amount of time to complete than other tests.

In some aspects, the test results may be placed in an output queue. For example, at $t_1$ to $t_2$, validation test 1 202 is performed on the second XR capable device. At $t_2$ to $t_3$, validation test 2 204 is performed. At $t_3$ to $t_4$, validation test 3 206 is performed. At $t_4$ to $t_5$, no validation test is performed. Instead, the test results from validation test 3 206 are in an output queue 210. At $t_5$ to $t_6$, validation test 4 208 is performed. If the output queue 210 is full, then an additional computing instance may be instantiated to perform validation test 4 208 at $t_5$ to $t_6$.

Additionally, multiple computing instances may generate and return a test result to one or more output queues concurrently. For example, at $t_2$ to $t_3$, validation test 1 202 is performed on the third XR capable device. At $t_3$ to $t_4$, validation test 2 204 is performed. At $t_4$ to $t_5$, no validation test is performed. Instead, the test results from validation test 2 204 are in an output queue 212. At $t_5$ to $t_6$, validation test 3 206 is performed. At $t_6$ to $t_7$, validation test 4 208 is performed.

Example Computing Device Components

Figure 3:
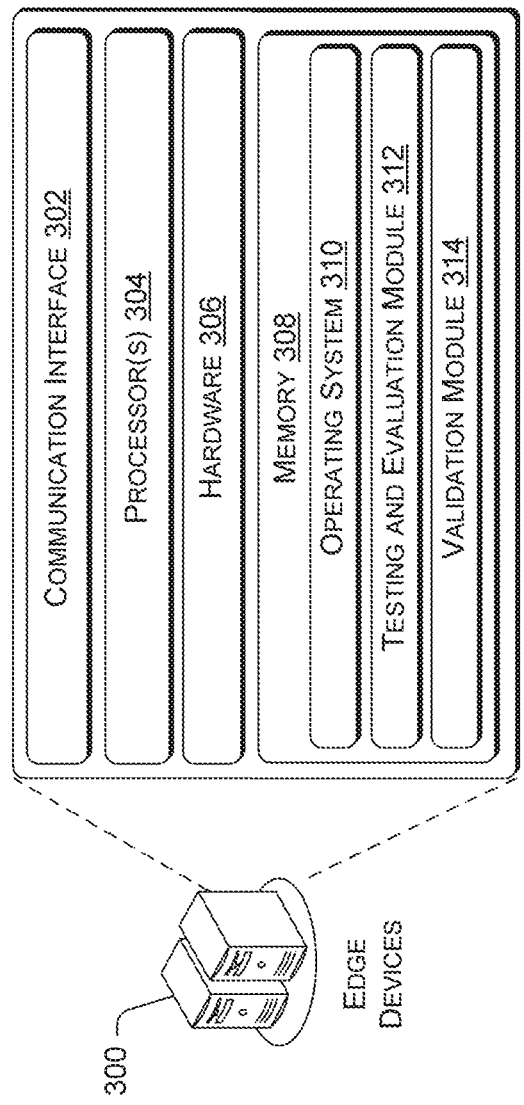
FIG. 3 is a block diagram showing various components of an illustrative edge device that performs validation testing.

FIG. 3 is a block diagram showing various components of illustrative edge devices 300 that performs validation testing. It is noted that the edge devices 300 as described herein can operate with more or fewer of the components shown herein. Additionally, the edge devices 300 as shown herein or portions thereof can serve as a representation of one or more of the computing devices of the present system.

The edge devices 300 may include a communication interface 302, one or more processors 304, hardware 306, and memory 308. The communication interface 302 may include wireless and/or wired communication components that enable the edge devices 300 to transmit data to and receive data from other networked devices. In at least one example, the one or more processor(s) 304 may be a central processing unit(s) (CPU), graphics processing unit(s) (GPU), both a CPU and GPU or any other sort of processing unit(s). Each of the one or more processor(s) 304 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution.

The one or more processor(s) 304 may also be responsible for executing all computer applications stored in the memory, which can be associated with common types of volatile (RAM) and/or nonvolatile (ROM) memory. The hardware 306 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 308 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 308 may also include a firewall. In some embodiments, the firewall may be implemented as hardware 306 in the edge devices 300.

The processors 304 and the memory 308 of the edge devices 300 may implement an operating system 310, testing and evaluation module 312, and a validation module 314. The operating system 310 may include components that enable the edge devices 300 to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The testing and evaluation module 312 is configured to perform one or more validation tests based at least on test configurations. The validation tests may include functional tests, performance tests, security tests, usability tests, compatibility tests, recoverability tests, regression tests, and/or so forth. In some aspects, the testing and evaluation module 312 may prioritize one or more validation tests according to the test configurations. Additionally, the testing and evaluation module 312 may assign individual validation tests to one or more computing instances in a testing and evaluation pipeline.

The validation module 314 may receive the test results from the testing and evaluation module 312 to generate a validation report and transmit the validation report to a testing log. In some aspects, the validation module 314 may analyze test results generated by one or more computing instances that execute one or more validation tests to determine whether the XR application is validated. The validation module 314 may analyze test results as individual validation tests are completed (e.g., in a sequence). Accordingly, the validation module 314 may instruct the testing and evaluation module 312 to terminate testing if one or more test results indicate that the XR application is not validated. Conversely, the validation module 314 may analyze test results when all validation tests are completed. In some aspects, the validation module 314 may analyze the test results in accordance with product requirements and evaluation criteria. Accordingly, the validation module 314 may indicate in the validation report whether the XR application is validated.

Figure 4:
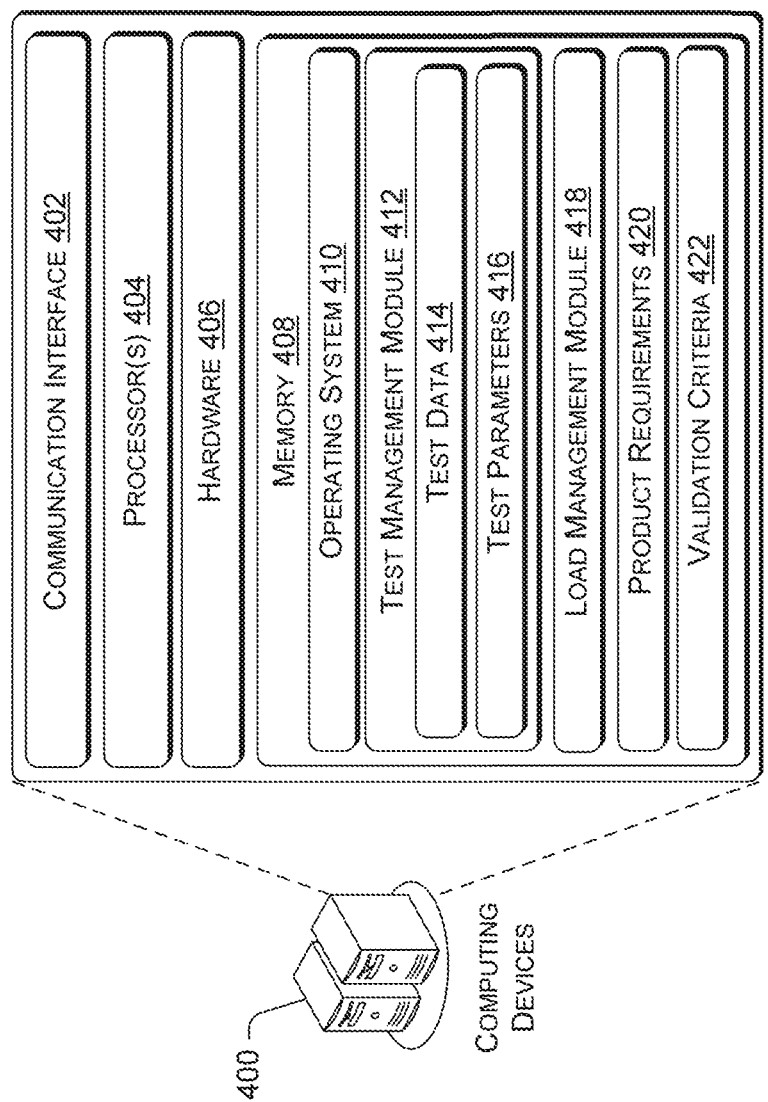
FIG. 4 is a block diagram showing various components of an illustrative computing device that manages validation testing and testing configurations.

FIG. 4 is a block diagram showing various components of illustrative computing devices 400 that manages validation testing and testing configurations. It is noted that the computing devices 400 as described herein can operate with more or fewer of the components shown herein. Additionally, the computing devices 400 as shown herein or portions thereof can serve as a representation of one or more of the computing devices of the present system.

The computing devices 400 may include a communication interface 402, one or more processors 404, hardware 406, and memory 408. The communication interface 402 may include wireless and/or wired communication components that enable the computing devices 400 to transmit data to and receive data from other networked devices. In at least one example, the one or more processor(s) 404 may be a central processing unit(s) (CPU), graphics processing unit(s) (GPU), both a CPU and GPU or any other sort of processing unit(s). Each of the one or more processor(s) 404 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution.

The one or more processor(s) 404 may also be responsible for executing all computer applications stored in the memory, which can be associated with common types of volatile (RAM) and/or nonvolatile (ROM) memory. The hardware 406 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 408 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 408 may also include a firewall. In some embodiments, the firewall may be implemented as hardware 406 in the computing devices 400.

The processors 404 and the memory 408 of the computing devices 400 may implement an operating system 410, a test management module 412, and a load management module 418. The operating system 410 may include components that enable the computing devices 400 to receive and transmit data via various interfaces (e.g., user controls, communication interface, and/or memory input/output devices), as well as process data using the processors 404 to generate output. The operating system 410 may include a presentation component that presents the output (e.g., display the data on an electronic display, store the data in memory, transmit the data to another electronic device, etc.). Additionally, the operating system 410 may include other components that perform various additional functions generally associated with an operating system.

The test management module 412 may manage test data 414 and test parameters 416 for one or more validation tests. The test data 414 may be created manually, by using data generation tools or retrieved from an existing production environment. Similarly, the test parameters 416 may be created manually, by using parameter generation tools or retrieved from an existing production environment. If created manually, the test parameters 416 may replace hard-coded values. In some aspects, parameter values for the test parameters 416 specified may be derived from another test or test script. For example, one or more of the parameter values may be derived from a previously performed validation test.

Additionally, the test management module 412 may generate testing configurations based at least on testing specifications from a device-specific library. In one example, the testing configurations may specify which validation tests to apply. The testing configurations may also identify which computing instance to instantiate in the testing and evaluation pipeline, and further assign individual computing instances to execute one or more validation tests During testing, the load management module 418 may be configured to act as a load balancer for one or more computing instances in a testing and evaluation pipeline. In some aspects, the load management module 418 may assign validation tests to the individual computing instances upon determining that an output queue for a computing instance is full. Upon completion of the one or more validation tests, the test management module 412 may receive a validation report from the testing and evaluation pipeline via a testing log. In turn, the test management module 412 may analyze the test results in the validation report to perform validation of the XR application based at least on product requirements 420 and evaluation criteria 422.

Example Processes

Figure 5:
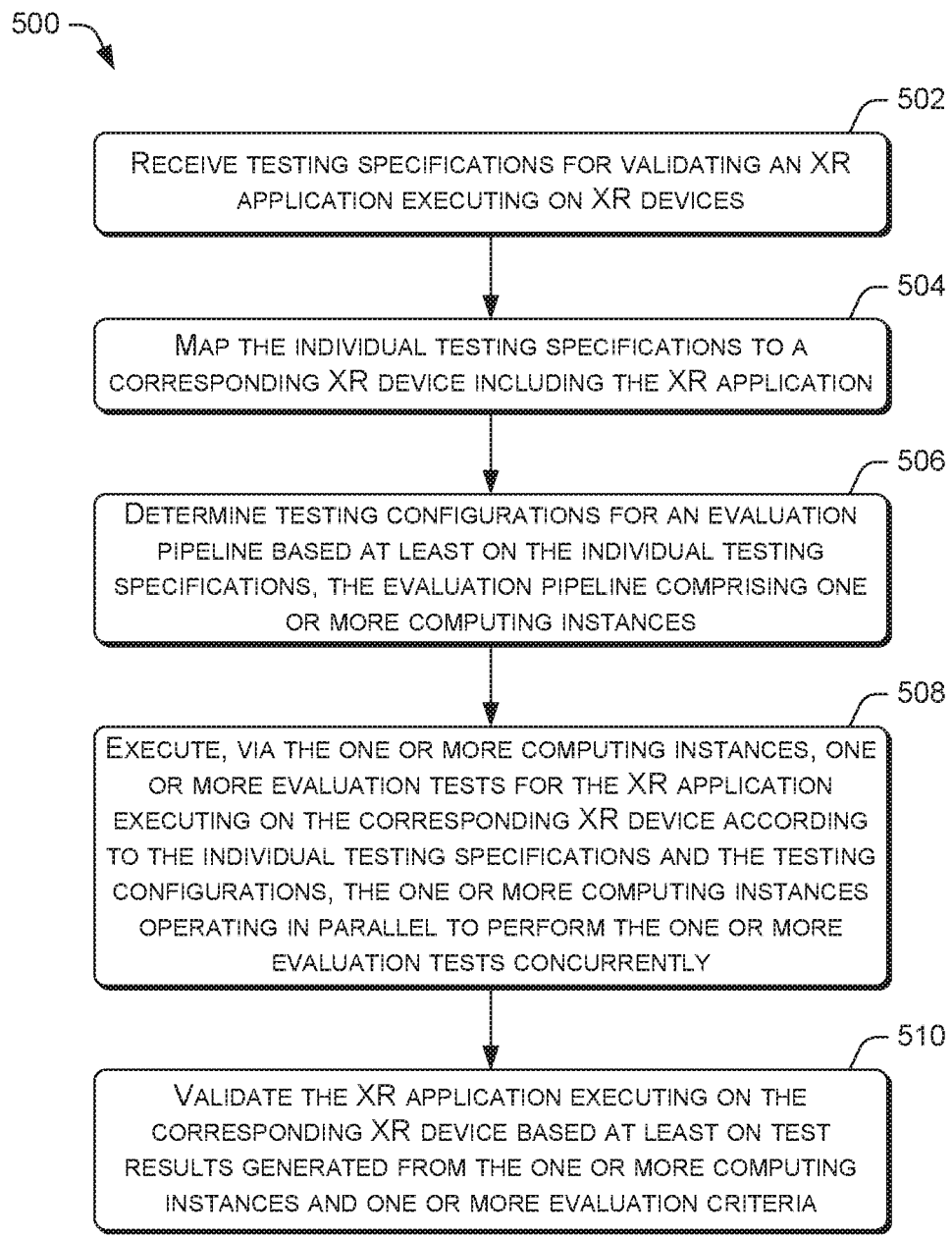
FIG. 5 is a flow diagram of an example process for implementing a testing and evaluation pipeline to perform the validation process and testing.
Figure 6:
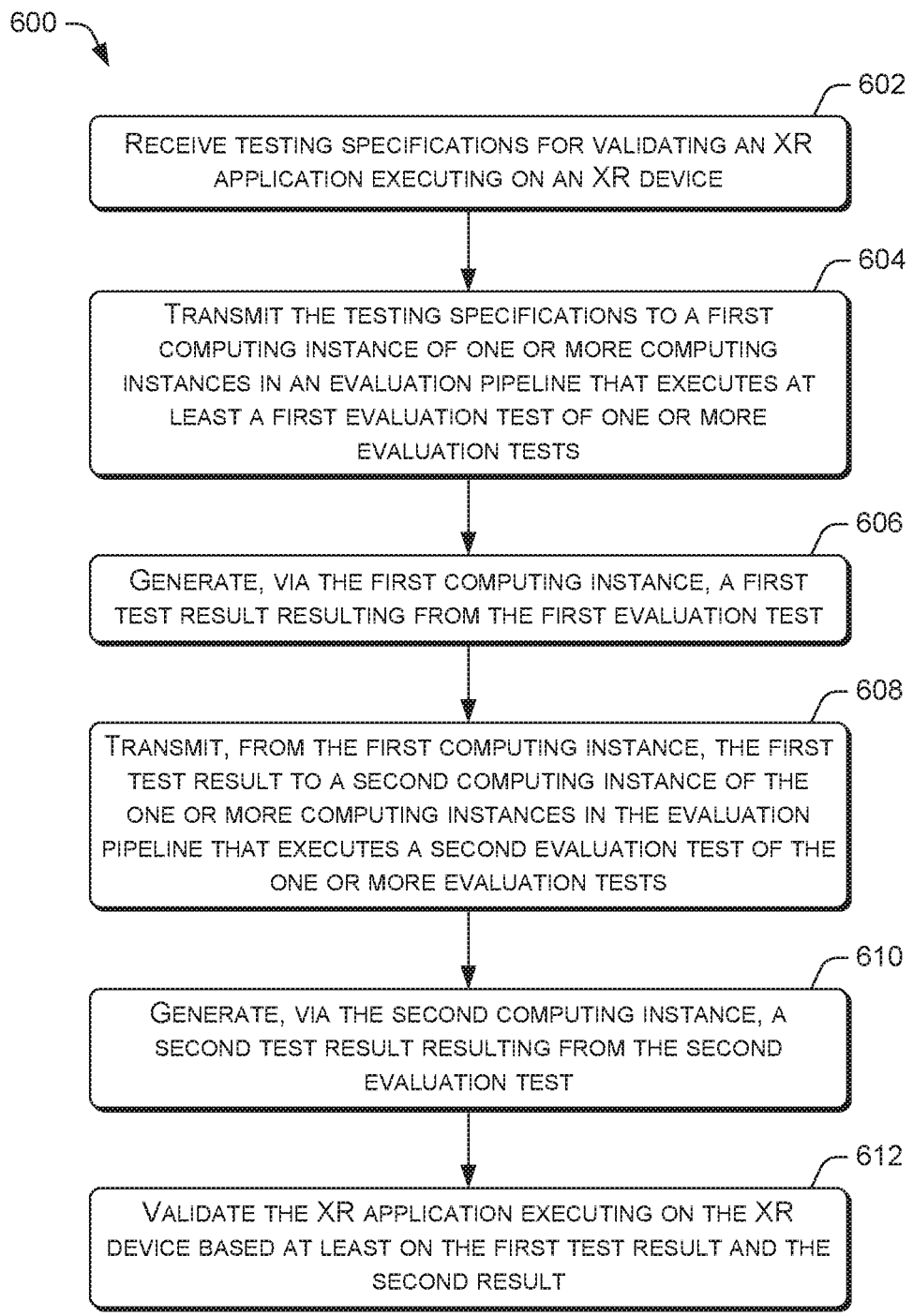
FIG. 6 is a flow diagram of an example process for executing validation testing via one or more computing instances of a testing and evaluation pipeline.

FIGS. 5-6 present illustrative processes 500 and 600 for performing validation tests from the perspective of one or more edge servers of distributed computing resources that provide one or more computing instances for a testing and evaluation pipeline. The processes 500 and 600 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500 and 600 are described with reference to FIGS. 1-4.

FIG. 5 is a flow diagram of an example process 500 for performing validation tests. At block 502, an edge server, via a testing and evaluation module, receives testing specifications for validating an XR application executing on XR devices. In some aspects, the testing and evaluation module may receive testing specifications from one or more device-specific libraries maintained by OEMs that produce various XR capable devices. The testing specifications may include information relating to the operating system, file system, hardware, and/or other software systems of an XR capable device that includes the XR application. At block 504, the testing and evaluation module maps the individual testing specifications to a corresponding XR device including the XR application. In some aspects, the testing and evaluation module may implement a lookup table for identifying corresponding XR devices. At block 506, the testing and evaluation module determines testing configurations for an evaluation pipeline based at least on the individual testing specifications, the evaluation pipeline comprising one or more computing instances. In some aspects, the testing and evaluation module may receive testing configurations from a testing and evaluation process monitoring server.

At block 508, the testing and evaluation module executes, via the one or more computing instances, one or more validation tests for the XR application executing on the corresponding XR device according to the individual testing specifications and the testing configurations, the one or more computing instances operating in parallel to perform the one or more validation tests concurrently. At block 510, the edge server, via a validation module, validates the XR application executing on the corresponding XR device based at least on test results generated from the one or more computing instances and one or more evaluation criteria. For example, the validation may include comparing each set of the test results to corresponding evaluation criteria. Accordingly, the test result generated by each computing instance may be determined to be validated when a set of test results meet corresponding evaluation criteria.

FIG. 6 is a flow diagram of an example process for executing validation testing via one or more computing instances of a testing and evaluation pipeline. At block 602, an edge server, via a testing and evaluation module, receives testing specifications for validating an XR application executing on an XR device. At block 604, the testing and evaluation module transmits the testing specifications to a first computing instance of one or more computing instances in an evaluation pipeline that executes at least a first validation test of one or more validation tests. At block 606, the first computing instance generates a first test result resulting from the first validation test. The validation test can comprise a number of sub-tests that yield a multiple test results that can be consolidated to a single test result, depending upon embodiments. For example, a validation test can perform multiple evaluations over a period of time. If the majority of the results from the multiple evaluations indicate a positive result, the consolidated result may also be positive.

At block 608, the first computing instance transmits the first test result to a second computing instance of the one or more computing instances in the evaluation pipeline that executes a second validation test of the one or more validation tests. At block 610, the second computing instance generates a second test result resulting from the second validation test. At block 612, edge server, via a validation module, validates the XR application executing on the XR device based at least on the first test result and the second test result. For example, the validation may include comparing each set of the test results to corresponding evaluation criteria. Accordingly, the test result generated by each computing instance may be determined to be validated when a set of test results meet corresponding evaluation criteria. In some embodiments, additional computing instances may be employed to perform additional validation tests according to testing configurations. In other words, operations similar to those described in blocks 604-612 may be repeated for the predetermined number of times when applicable, so that each preceding computing instance in the evaluation pipeline transmits a test result for additional evaluation testing by a subsequent computing instance in the evaluation pipeline until all the tests specified by the testing specifications are complete.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:

receiving testing specifications for validating an XR capable device executing an XR application and configured to wirelessly connect to a cellular network;

mapping individual testing specifications to a corresponding XR capable device;

determining testing configurations for an evaluation pipeline based at least on the individual testing specifications, the evaluation pipeline comprising one or more computing instances;

executing, via the one or more computing instances, one or more validation tests for the XR application according to the individual testing specifications and the testing configurations, the one or more computing instances operating in parallel to perform the one or more validation tests concurrently, wherein the one or more validation tests comprises determining whether a wireless connection between the XR capable device and one or more wireless base stations of the cellular network performs according to one or more requirements of a cellular communication protocol; and validating the XR application executing on the corresponding XR capable device based at least on test results generated from the one or more computing instances and one or more evaluation criteria.

2. The one or more non-transitory computer-readable media of claim 1, wherein the acts further comprise:

selecting the one or more validation tests to execute on the one or more individual computing instances based at least on the testing configurations.

3. The one or more non-transitory computer-readable media of claim 1, where in the acts further comprise:

transmitting the individual testing specifications to a first computing instance of the one or more computing instances in the evaluation pipeline that executes at least a first validation test of the one or more validation tests;

generating, via the first computing instance, a first test result resulting from the first validation test;

transmitting, from the first computing instance, the first test result to a second computing instance of the one or more computing instances in the evaluation pipeline that executes a second validation test of the one or more validation tests;

generating, via the second computing instance, a second test result resulting from the second validation test; and validating the XR application executing on the corresponding XR capable device based at least on the first test result and the second result.

4. The one or more non-transitory computer-readable media of claim 1, wherein the acts further comprise:

returning a portion of the test results to an output queue provided by a first computing instance of the one or more computing instances;

determining whether the output queue is full; and initiating a second computing instance of the one or more computing instances executing a duplicate of the one or more validation tests executed on the first computing instance.

5. The one or more non-transitory computer-readable media of claim 1, wherein the one or more computing instances comprise a first computing instance and a second computing instance, the first computing instance executing the one or more validation tests for the XR application executing on a first XR capable device of the XR capable devices and the second computing instance executing the one or more validation tests for the XR application executing on a second XR capable device of the XR capable devices.

6. The one or more non-transitory computer-readable media of claim 1, wherein the acts further comprise:

receiving product requirements for the corresponding XR capable device from an original equipment manufacturer (OEM) associated with the corresponding XR capable device; and validating the XR application executing on the corresponding XR capable device based at least on the product requirements.

7. The one or more non-transitory computer-readable media of claim 6, wherein the acts further comprise:

selecting the one or more validation tests to execute on the one or more individual computing instances based at least on the product requirements.

8. The one or more non-transitory computer-readable media of claim 1, wherein the XR capable device comprises a head-mounted device (HMD).

9. A computer-implemented method, comprising:

receiving testing specifications for validating an XR capable device executing an XR application and configured to wirelessly connect to a cellular network;

mapping individual testing specifications to a corresponding XR capable device;

determining testing configurations for an evaluation pipeline based at least on the individual testing specifications, the evaluation pipeline comprising one or more computing instances;

executing, via the one or more computing instances, one or more validation tests for the XR application according to the individual testing specifications and the testing configurations, the one or more computing instances operating in parallel to perform the one or more validation tests concurrently, wherein the one or more validation tests comprises determining whether a wireless connection between the XR capable device and one or more wireless base stations of the cellular network performs according to one or more requirements of a cellular communication protocol; and validating the XR application executing on the corresponding XR capable device based at least on test results generated from the one or more computing instances and one or more evaluation criteria.

10. The computer-implemented method of claim 9, further comprising:

selecting the one or more computing instances to execute the one or more validation tests in the evaluation pipeline based at least on the testing configurations.

11. The computer-implemented method of claim 9, further comprising:

determining a processing time for completing the one or more validation tests; and if the processing time exceeds a predetermined threshold, initiating an additional computing instance executing a duplicate of the one or more validation tests.

12. The computer-implemented method of claim 9, further comprising:

receiving product requirements for the corresponding XR capable device from an original equipment manufacturer (OEM) associated with the corresponding XR capable device; and validating the XR application executing on the corresponding XR capable device based at least on the product requirements.

13. The computer-implemented method of claim 9, further comprising:

selecting the one or more validation tests to execute on the one or more individual computing instances based at least on the product requirements.

14. A system, comprising:

one or more wireless base stations; and one or more computer processing components configured to:

receive testing specifications for validating an XR capable device executing an XR application and configured to wirelessly connect to a cellular network;

map individual testing specifications to a corresponding XR capable device;

determine testing configurations for an evaluation pipeline based at least on the individual testing specifications, the evaluation pipeline comprising one or more computing instances;

execute, via the one or more computing instances, one or more validation tests for the XR application according to the individual testing specifications and the testing configurations, the one or more computing instances operating in parallel to perform the one or more validation tests concurrently, wherein the one or more validation tests comprises determining whether a first wireless connection between the XR capable device and one or more wireless base stations of the cellular network performs according to one or more requirements of a cellular communication protocol; and validate the XR application executing on the corresponding XR capable device based at least on test results generated from the one or more computing instances and one or more evaluation criteria.

15. The system of claim 14, wherein the one or more validation tests additionally comprise determining whether the one or more wireless base stations can support the XR application at a peak user level.

16. The system of claim 14, wherein the one or more validation tests additionally comprise determining whether an energy consumption of the XR device can support the XR application under a loaded condition.

17. The system of claim 14, wherein the one or more validation tests additionally comprise determining whether the XR application performs at a threshold performance level when the XR device has a handover from the first wireless connection to a second wireless connection, the first wireless connection being a cellular data connection and the second wireless connection being a WiFi data connection.

18. The system of claim 14, wherein the one or more validation tests additionally comprise determining whether the XR application functions when the first wireless connection is intermittent.

19. The system of claim 14, wherein the one or more validation tests additionally comprise determining whether unauthorized users have access to unsolicited information associated with the XR application and XR device.

20. The system of claim 14, wherein the one or more validation tests additionally comprise determining whether the XR application recovers appropriately following a suspension of the first wireless connection.

* * * * *